United States Patent
Bhatia (10) Patent No.: US 8,423,511 B1
(45) Date of Patent: Apr. 16, 2013

(54) SYSTEMS AND METHODS FOR SECURING DATA ON MOBILE DEVICES

(75) Inventor: Yadvinder Bhatia, Punjab (IN)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 13/178,068

(22) Filed: Jul. 7, 2011

(51) Int. Cl.
*G06F 7/00* (2006.01)
*G06F 17/00* (2006.01)

(52) U.S. Cl.
USPC .......................................................... 707/654

(58) Field of Classification Search ................... 707/654
See application file for complete search history.

(56) References Cited

U.S. PATENT DOCUMENTS

| | | | |
|---|---|---|---|
| 7,188,101 B2 * | 3/2007 | Smyth | 1/1 |
| 2005/0001024 A1 * | 1/2005 | Kusaka et al. | 235/375 |
| 2007/0143827 A1 * | 6/2007 | Nicodemus et al. | 726/2 |
| 2008/0171556 A1 * | 7/2008 | Carter | 455/456.1 |
| 2010/0114835 A1 * | 5/2010 | Tsai | 707/654 |

OTHER PUBLICATIONS

Bhatia, Yadvinder; Systems and Methods for Tracking Paired Computing Devices; U.S. Appl. No. 12/982,552; Dec. 30, 2010.
NOKIA, Bluetooth Vibrating Bracelet—Mobile Phone Theft Prevention; http://www.blueunplugged.com/Bluetooth-Vibrating-Bracelet.aspx; Taken from site on Dec. 30, 2010.

* cited by examiner

*Primary Examiner* — Robert Beausoliel, Jr.
*Assistant Examiner* — Nicholas Allen
(74) *Attorney, Agent, or Firm* — ALG Intellectual Property, LLC (57) ABSTRACT

A computer-implemented method for securing data on mobile devices may include (1) identifying a first computing device and a second computing device paired via a wireless communication technology that facilitates communication between the first computing device and the second computing device, (2) identifying a maximum expected distance between the first and second computing devices, (3) calculating a current distance between the first and second computing devices, (4) determining that the current distance between the first and second computing devices exceeds the maximum expected distance between the first and second computing devices, and (5) backing up data stored on the first computing device in response to the determination that the current distance exceeds the maximum expected distance. Various other methods, systems, and computer-readable media are also disclosed.

20 Claims, 6 Drawing Sheets

SYSTEMS AND METHODS FOR SECURING DATA ON MOBILE DEVICES

BACKGROUND

Computing devices have become a ubiquitous part of everyday life. For example, millions of people carry and use mobile computing devices (e.g., cellular telephones, MP3 players, laptops, Bluetooth headsets, etc.) throughout their daily activities. However, such computing devices (especially relatively small, mobile computing devices) may be easily misplaced by users and/or stolen by thieves. The loss of a mobile computing device may not only represent the loss of the value of the device to the owner, but also the loss of important data stored on the device. In addition, private or even confidential data may be stored on the device, exposing the owner of a lost device to potential privacy and/or security risks.

Unfortunately, while traditional data security mechanisms may periodically back up data on mobile computing devices, preserving data from lost mobile devices may be time sensitive, especially if the device was stolen (e.g., a thief may wipe all data from the device). Furthermore, private and/or confidential data may fall into the wrong hands. Accordingly, the instant disclosure identifies a need for additional and improved systems and methods for securing data on mobile devices.

SUMMARY

As will be described in greater detail below, the instant disclosure generally relates to systems and methods for securing data on mobile devices. In some examples, the systems described herein may accomplish such a task by (1) identifying a first computing device and a second computing device paired via a wireless communication technology that facilitates communication between the first computing device and the second computing device, (2) identifying a maximum expected distance between the first and second computing devices, (3) calculating a current distance between the first and second computing devices, (4) determining that the current distance between the first and second computing devices exceeds the maximum expected distance between the first and second computing devices, and (5) backing up data stored on the first computing device in response to the determination that the current distance exceeds the maximum expected distance.

In one example, a system for performing the above-described method may include one or more processors configured to execute an identification module, a calculation module, a determination module, and a backup module. The identification module may be programmed to (1) identify a first computing device and a second computing device paired via a wireless communication technology that facilitates communication between the first computing device and the second computing device and (2) identify a maximum expected distance between the first and second computing devices. The calculation module may be programmed to calculate a current distance between the first and second computing devices. The determination module may be programmed to determine that the current distance between the first and second computing devices exceeds the maximum expected distance between the first and second computing devices. The backup module may be programmed to back up data stored on the first computing device in response to the determination that the current distance exceeds the maximum expected distance.

The backup module may back up the data in any of a variety of ways. For example, the backup module may (1) identify sensitive data stored on the first computing device and (2) designate the sensitive data for backup. Additionally or alternatively, the backup module may (1) identify a prioritization for backing up files on the first computing device and (2) back up the files in an order according to the prioritization. In some examples, the prioritization may include prioritizing user-composed communications over other data and/or prioritizing contact information over other data. Additionally or alternatively, the prioritization may include prioritizing data associated with a user account on the first computing device marked for prioritization.

The backup module may back up the data to any of a variety of targets. For example, the backup module may back up the data to the second computing device. Additionally or alternatively, the backup module may back up the data to an online third-party storage device. In some examples, the backup module may be additionally programmed to delete the data stored on the first computing device after backing up the data stored on the first computing device.

As will be explained in greater detail below, by automatically backing up data on a mobile device when the mobile device is removed from one or more other devices by an unexpected distance, the systems and methods described herein may efficiently secure data on the mobile device. Furthermore, by automatically deleting this data after backing up the data, these systems and methods may also prevent unintended and/or unauthorized access to private, confidential, and/or otherwise sensitive data. Additionally, by prioritizing the data that is to be backed up, the systems and methods described herein may ensure that the most important, valuable, and/or sensitive data is secured before any potential interference with the backup process that may otherwise present a particular danger to lost mobile devices.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 1:
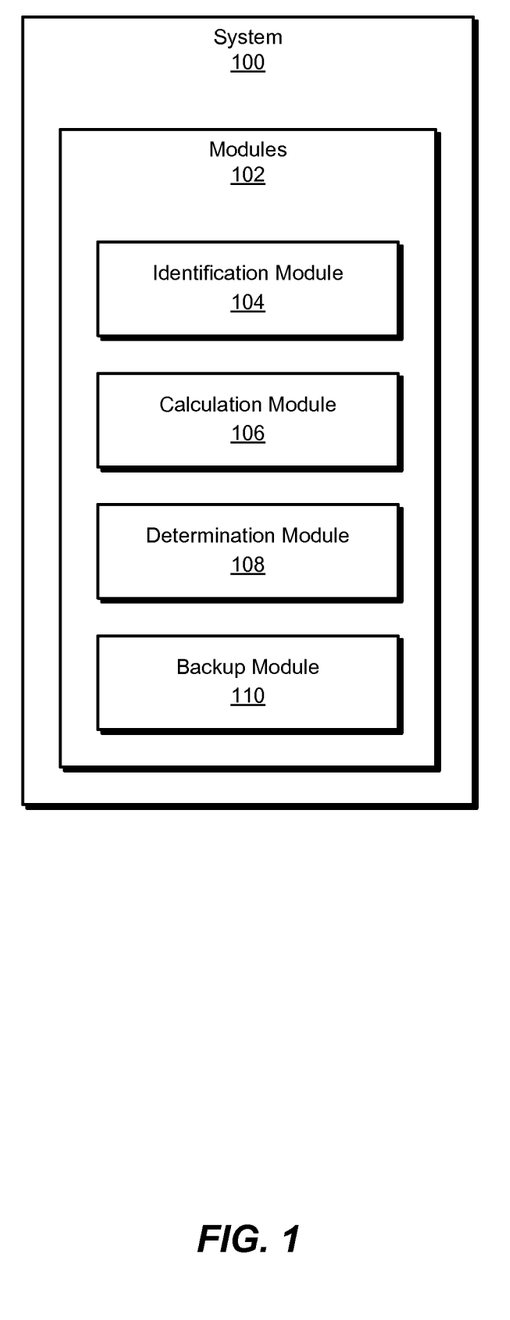
FIG. 1 is a block diagram of an exemplary system for securing data on mobile devices.
Figure 2:
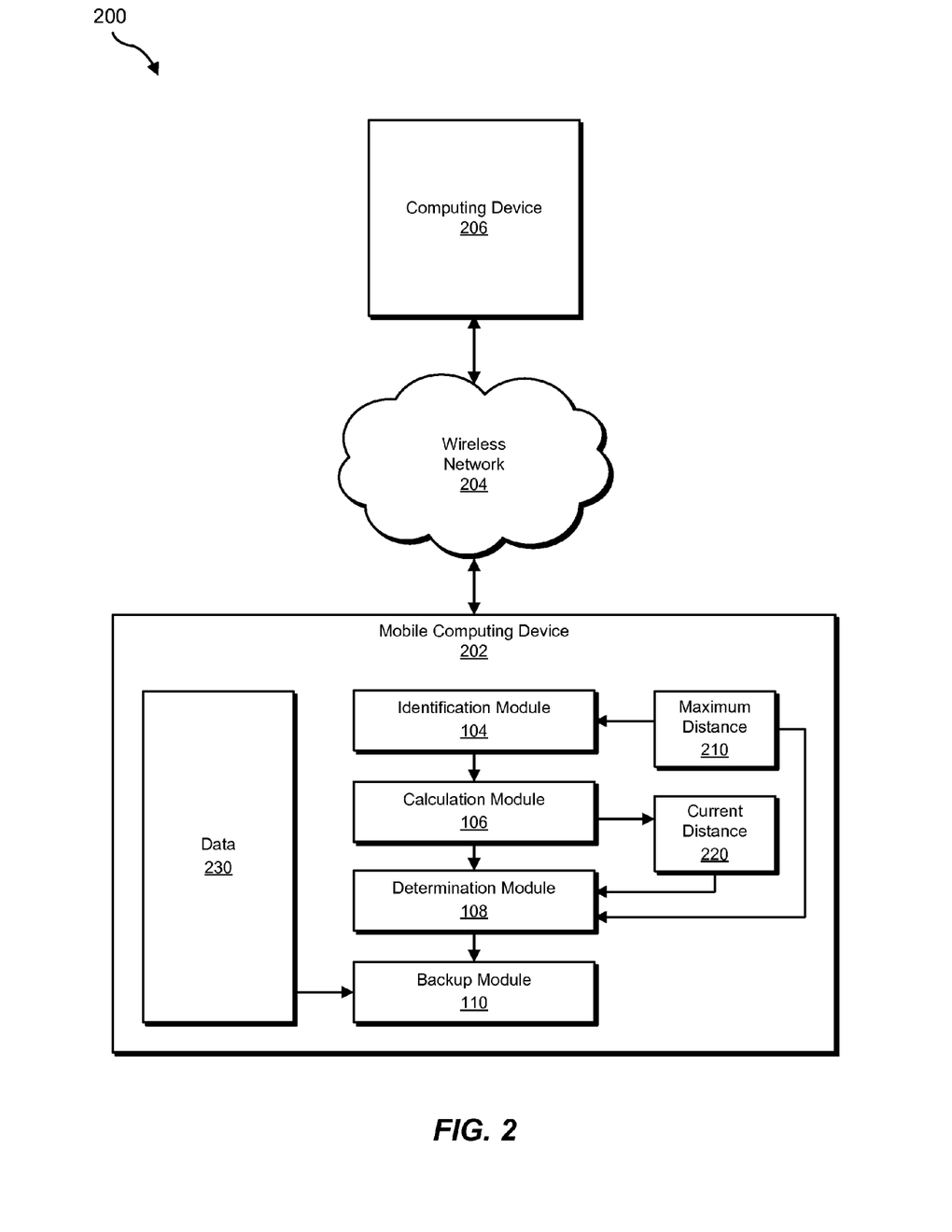
FIG. 2 is a block diagram of an exemplary system for securing data on mobile devices.
Figure 3:
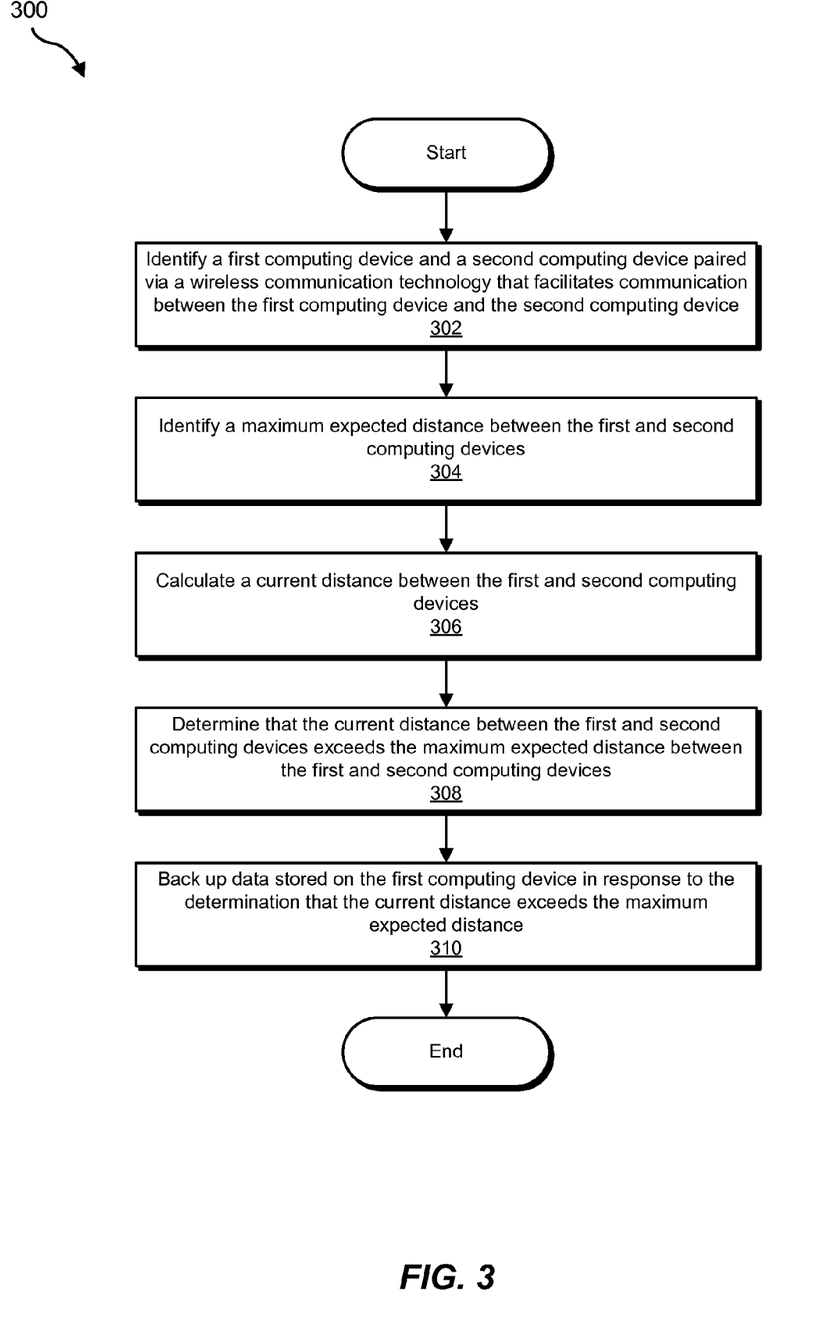
FIG. 3 is a flow diagram of an exemplary method for securing data on mobile devices.
Figure 4:
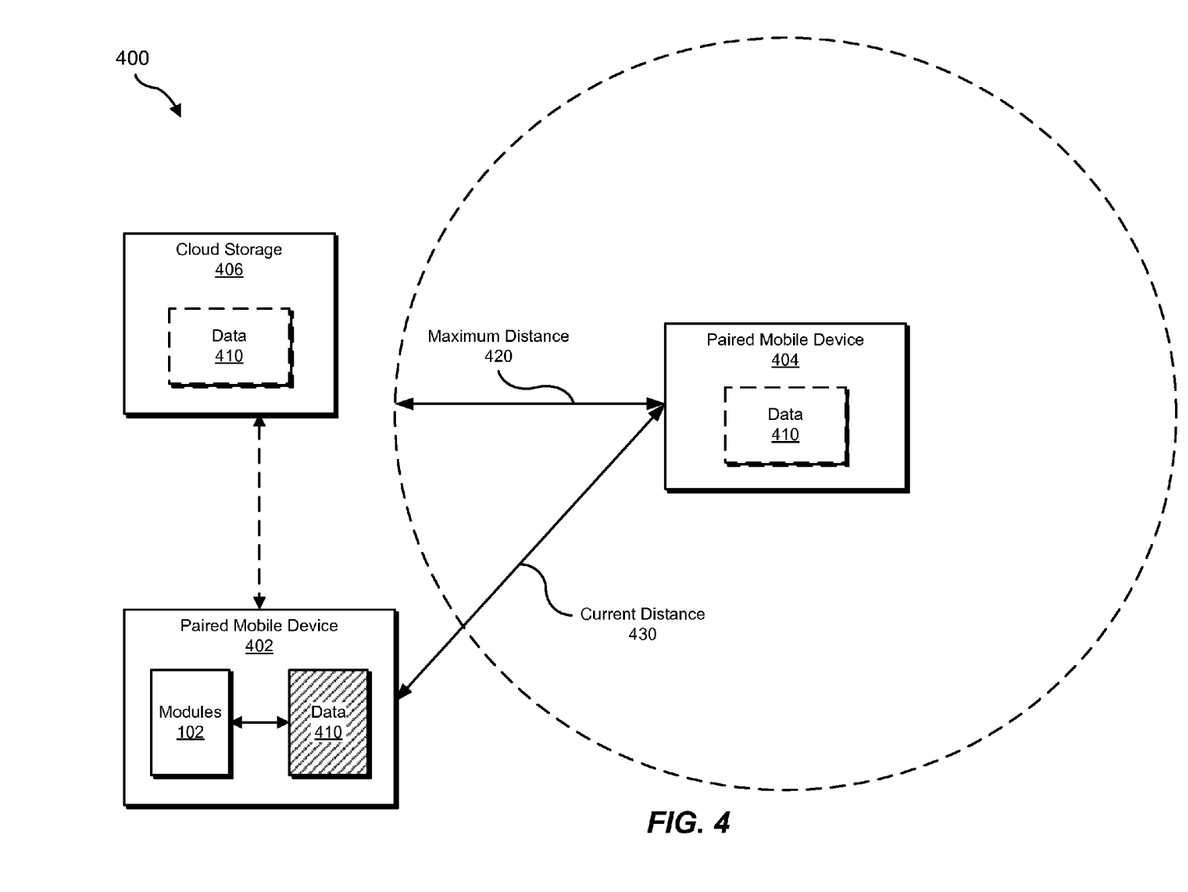
FIG. 4 is a block diagram of an exemplary system for securing data on mobile devices.

The following will provide, with reference to FIGS. 1, 2, and 4, detailed descriptions of exemplary systems for securing data on mobile devices. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for securing data on mobile devices. As illustrated in this figure, exemplary system 100 may include one or more modules 102 for performing one or more tasks. For example, and as will be explained in greater detail below, exemplary system 100 may include an identification module 104 may be programmed to (1) identify a first computing device and a second computing device paired via a wireless communication technology that facilitates communication between the first computing device and the second computing device and (2) identify a maximum expected distance between the first and second computing devices. Exemplary system 100 may also include a calculation module 106 programmed to calculate a current distance between the first and second computing devices. Exemplary system 100 may additionally include a determination module 108 programmed to determine that the current distance between the first and second computing devices exceeds the maximum expected distance between the first and second computing devices.

In addition, and as will be described in greater detail below, exemplary system 100 may include a backup module 110 programmed to back up data stored on the first computing device in response to the determination that the current distance exceeds the maximum expected distance. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., mobile computing device 202 and/or computing device 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

Exemplary system 100 in FIG. 1 may be deployed in a variety of ways. For example, all or a portion of exemplary system 100 may represent portions of exemplary system 200 illustrated in FIG. 2. As shown in FIG. 2, system 200 may include a mobile computing device 202 in communication with a computing device 206 via a wireless network 204. In one embodiment, and as will be described in greater detail below, modules 102 from FIG. 1 may program mobile computing device 202 to secure data 230 on mobile computing device 202 by (1) identifying a first computing device (e.g., mobile computing device 202) and a second computing device (e.g., computing device 206) paired via a wireless communication technology that facilitates communication between the first computing device and the second computing device (e.g., wireless network 204), (2) identifying a maximum expected distance between the first and second computing devices (e.g., a maximum distance 210), (3) calculating a current distance between the first and second computing devices (e.g., a current distance 220), (4) determining that the current distance between the first and second computing devices exceeds the maximum expected distance between the first and second computing devices (e.g., determining that current distance 220 exceeds maximum distance 210), and (5) backing up data stored on the first computing device (e.g., data 230) in response to the determination that the current distance exceeds the maximum expected distance.

Mobile computing device 202 generally represents any type or form of computing device capable of reading computer-executable instructions. Examples of mobile computing device 202 include, without limitation, laptops, tablets, cellular phones, personal digital assistants (PDAs), multimedia players, embedded systems, combinations of one or more of the same, exemplary computing system 510 in FIG. 5, or any other suitable computing device.

Computing device 206 generally represents any type or form of computing device capable of reading computer-executable instructions. Examples of computing device 206 include, without limitation, laptops, desktops, servers, cellular phones, personal digital assistants (PDAs), multimedia players, embedded systems, combinations of one or more of the same, exemplary computing system 510 in FIG. 5, or any other suitable computing device.

Wireless network 204 generally represents any medium or architecture capable of facilitating communication or data transfer between two or more devices. Examples of wireless network 204 include, without limitation, a Bluetooth technology (such as a device that facilitates communication using the Bluetooth technology standard), a Wi-Fi network (such as a wireless local area network (WLAN) or a wireless personal area network (WPAN)), a cellular network (such as a GSM network or a CDMA network), or any other suitable wireless communication technology. In one embodiment, wireless network 204 may facilitate communication between mobile computing device 202 and computing device 206.

FIG. 3 is a flow diagram of an exemplary computer-implemented method 300 for securing data on mobile devices. The steps shown in FIG. 3 may be performed by any suitable computer-executable code and/or computing system. In some embodiments, the steps shown in FIG. 3 may be performed by one or more of the components of system 100 in FIG. 1 and/or system 200 in FIG. 2.

As illustrated in FIG. 3, at step 302 one or more of the systems described herein may identify a first computing device and a second computing device paired via a wireless communication technology that facilitates communication between the first computing device and the second computing device. For example, at step 302 identification module 104 may, as part of mobile computing device 202, in FIG. 2 identify mobile computing device 202 and computing device 206.

The term "paired," as used herein, generally refers to any type or form of secure connection that has been established between a plurality of computing devices. In some examples, this secure connection may enable paired computing devices to exchange encrypted communications and prevent other non-paired computing devices from interpreting encrypted communications exchanged between the paired computing devices. In addition, the phrase "wireless communication technology," as used herein, may refer to any suitable protocol and/or technology for facilitating wireless communication. Examples of such technologies include, without limitation, Wi-Fi, the Global Positioning System ("GPS"), and General Packet Radio Service.

Identification module 104 may perform step 302 in a variety of ways. In one example, identification module 104 may identify a link key that enables the first and second computing devices to cryptographically authenticate communications received from one another. In another example, identification module 104 may identify at least one encrypted communication sent between the first and second computing devices.

In some embodiments, the link key may be used to generate an encryption/decryption key that enables the paired first and second computing devices to encrypt and/or decrypt communications from one another. In other embodiments, the link key itself may serve as an encryption/decryption key that enables the first and second computing devices to encrypt and/or decrypt communications from one another.

In a further example, identification module 104 may determine that a plurality of computing devices, including the first and second computing devices, are paired via a wireless communication technology by identifying at least one device identifier (such as an IP address, a MAC address, or a phone number) of the second computing device on the first computing device.

In other embodiments, identification module 104 may determine that the first and second computing devices are paired by querying the second computing device. For example, identification module 104 may query an operating system, Bluetooth service, wireless service, and/or any other suitable system on a device to determine whether the device is paired with another device.

FIG. 4 illustrates an exemplary system 400 for securing data on mobile devices. As illustrated in FIG. 4, exemplary system 400 may include a paired mobile device 402 and a paired mobile device 404. Using FIG. 4 as an example, at step 302 identification module 104 may identify paired mobile devices 402 and 404.

Returning to FIG. 3, at step 304 one or more of the systems described herein may identify a maximum expected distance between the first and second computing devices. For example, at step 304 identification module 104 may, as part of mobile computing device 202, identify maximum distance 210 between mobile computing device 202 and computing device 206. Using FIG. 4 as an additional example, at step 304 identification module 104 may as, part of paired mobile device 402, identify a maximum distance 420 between paired mobile devices 402 and 404.

The maximum expected distance may represent any of a variety of values. In some examples, the maximum expected distance may represent any distance within which the wireless communication technology is capable of facilitating communication between the first and second computing devices. In other examples, the maximum expected distance may be established as the maximum range of wireless communications between the paired devices.

Identification module 104 may perform step 304 in a variety of ways. In one example, identification module 104 may identify the maximum expected distance by obtaining a predetermined maximum distance from security software installed on the first computing device. For example, the predetermined maximum distance may be stored as a default setting within the security software installed on the first computing device.

In another example, identification module 104 may enable a user of the first computing device to specify the maximum expected distance. For example, identification module 104 may cause the first computing device to display a user interface that enables a user of the first computing device to enter the maximum distance. In this example, the user interface may prompt the user to enter the maximum expected distance or simply allow the user to change the maximum expected distance (from, e.g., a predetermined maximum distance) without being prompted.

Returning to FIG. 3, at step 306 one or more of the systems described herein may calculate a current distance between the first and second computing devices. For example, at step 306 calculation module 106 may, as part of mobile computing device 202, calculate current distance 220 between mobile computing device 202 and computing device 206. Using FIG. 4 as an additional example, at step 306 calculation module 106 may as, part of paired mobile device 402, calculate a current distance 430 between paired mobile devices 402 and 404.

Calculation module 106 may perform step 306 in any of a variety of contexts. For example, calculation module 106 may be configured to calculate a new current distance at scheduled intervals. In one example, the first computing device may send a communication to the second computing device and determine the amount of time required to send the communication from the first computing device to the second computing device. In this example, calculation module 106 may then use the amount of time required to send the communication to calculate the current distance between the first and second computing devices. For example, calculation module 106 may calculate the current distance by multiplying the amount of time required to send the communication by the known speed (e.g., the speed of light divided by the refractive index of air) at which the communication travelled from the first computing device to the second computing device.

In another example, calculation module 106 may obtain coordinates that identify a geographic location of the each of the first and second computing devices. For example, calculation module 106 may obtain a set of GPS coordinates that identify the geographic location of the first computing device 202(1) from a GPS device located on the second computing device. Similarly, calculation module 106 may obtain another set of GPS coordinates that identify the geographic location of the second computing device from another GPS device located on the second computing device. In this example, calculation module 106 may cause the first computing device to send the set of GPS coordinates that identify the geographic location of the first computing device to the second computing device.

After the second computing device has received the set of GPS coordinates that identify the geographic location of the first computing device, calculation module 106 may use both sets of GPS coordinates to calculate the current distance between the first and second computing devices. For example, calculation module 106 may identify the respective latitude and longitude coordinates of the first and second computing devices within the sets of GPS coordinates. In this example, calculation module 106 may then calculate the current distance between the first and second computing devices by applying the latitude and longitude coordinates to a Haversine formula based on the Earth's radius.

In some embodiments, calculation module 106 may calculate a current distance between the first and second computing devices by determining that the first and second computing devices are not within range of one another. For example, calculation module 106 may determine that the first and second computing devices are no longer within a wireless range of each other (e.g., by determining that the devices are no longer paired and/or that the devices are unable to pair). In such embodiments, the maximum distance may be established by the range of the wireless mechanism used to pair the devices.

Returning to FIG. 3, at step 308 one or more of the systems described herein may determine that the current distance between the first and second computing devices exceeds the maximum expected distance between the first and second computing devices. For example, at step 308 determination module 108 may, as part of mobile computing device 202, determine that current distance 220 between mobile computing device 202 and computing device 206 exceeds maximum distance 210. Using FIG. 4 as an additional example, at step 308 determination module 108 may as, part of paired mobile device 402, determine that current distance 430 between paired mobile devices 402 and 404 exceeds maximum distance 420.

Determination module 108 may perform step 308 in a variety of ways. In one example, determination module 108 may determine that the current distance exceeds the maximum expected distance by comparing the current distance with the maximum expected distance to determine which is greater.

In embodiments where calculating the current distance between paired computing devices includes determining that the first and second computing devices are no longer within wireless range of each other, determining that the current distance between the first and second computing devices exceeds the maximum expected distance may include checking a policy (e.g., a policy set by establishing the maximum expected distance in step 304) to determine whether the devices are allowed out of wireless range of one another. If the policy indicates that the devices are not allowed to be out of wireless range of one another, determination module 108 may conclude that the maximum distance has been exceeded. In such embodiments, the paired devices may not be able to communication with each other, and any notifications sent between the paired devices may be transmitted through an intermediate network (e.g., the Internet, a WAN, a LAN, etc.) and/or through an intermediate paired device that is still within range of each of the other paired devices.

Returning to FIG. 3, at step 310 one or more of the systems described herein may back up data stored on the first computing device in response to the determination that the current distance exceeds the maximum expected distance. For example, at step 310 backup module 110 may, as part of mobile computing device 202, back up data 230. Using FIG. 4 as an additional example, at step 310 backup module 110 may as, part of paired mobile device 402, back up data 410 on paired mobile device 402.

Backup module 110 may back up the data in any of a variety of ways. For example, the backup module 110 may first identify sensitive data stored on the first computing device. As used herein, the phrase "sensitive data" may refer to any data that is private, confidential, and/or which otherwise should not be disseminated without intent and/or authorization. Backup module 110 may identify the sensitive data in any of a variety of ways. For example, backup module 110 may identify data tagged as private, confidential, and/or otherwise sensitive. Additionally or alternatively, backup module 110 may identify data identify data likely to be sensitive. For example, backup module 110 may use one or more heuristics to identify likely sensitive data. For example, backup module 110 may scan the data for keywords (e.g., "confidential"), determine that certain file types are more likely to contain sensitive data (e.g., pictures and word processing documents as opposed to application data files), and/or identify the context in which the data was created and/or is used (e.g., whether the data was received as an attachment sent to a work email address, whether a picture was taken with a camera on the mobile device or downloaded as part of rendering a website). After identifying the sensitive data, backup module 110 may designate the sensitive data for backup.

In some examples, backup module 110 may identify a prioritization for backing up files on the first computing device and then back up the files in an order according to the prioritization. As used herein, the term "prioritization" may refer to any scheme for ordering and/or partially ordering items. In some examples, backup module 110 may prioritize user-related data over other data. For example, backup module 110 may prioritize user-composed communications (such as emails, Short Message Service messages, etc.) over other data. Additionally or alternatively, backup module 110 may prioritize contact information (e.g., address books, contact directories, email addresses, phone numbers, etc.) over other data. In some examples, backup module 110 may prioritize data associated with a user account on the first computing device marked for prioritization. For example, a user may have marked the user account for prioritization. Additionally or alternatively, backup module 110 may mark a primary user account and/or a most frequently used user account for prioritization. In some examples, backup module 110 may prioritize data by how frequently and/or recently the data has been used and/or touched.

Backup module 110 may back up the data to any of a variety of targets. For example, backup module 110 may back up the data to the second computing device. Additionally or alternatively, backup module 110 may back up the data to an online third-party storage device. Using FIG. 4 as an example, in some examples backup module 110 may back up data 410 to paired mobile device 404. Additionally or alternatively, backup module 110 may back up data 410 to a cloud storage 406. In some examples, backup module 110 may back up the data to another location. For example, backup module 110 may back up the data to a third computing device linked the first computing device by a wireless communication technology.

In some examples, backup module 110 may be additionally programmed to delete the data stored on the first computing device after backing up the data stored on the first computing device. For example, backup module 110 may be programmed to delete the data immediately after the data is backed up to ensure that the data cannot be accessed without authorization by a third party that has acquired the first computing device. In some examples, backup module 110 may additionally delete other data that was not backed up. For example, backup module 110 may delete cache data (such as web browsing cache data, application session data, etc.) even if the cache data was not backed up.

As detailed above, by automatically backing up data on a mobile device when the mobile device is removed from one or more other devices by an unexpected distance, the systems and methods described herein may efficiently secure data on the mobile device. Furthermore, by automatically deleting this data after backing up the data, these systems and methods may also prevent unintended and/or unauthorized access to private, confidential, and/or otherwise sensitive data. Additionally, by prioritizing the data that is to be backed up, the systems and methods described herein may ensure that the most important, valuable, and/or sensitive data is secured before any potential interference with the backup process that may otherwise present a particular danger to lost mobile devices.

Figure 5:
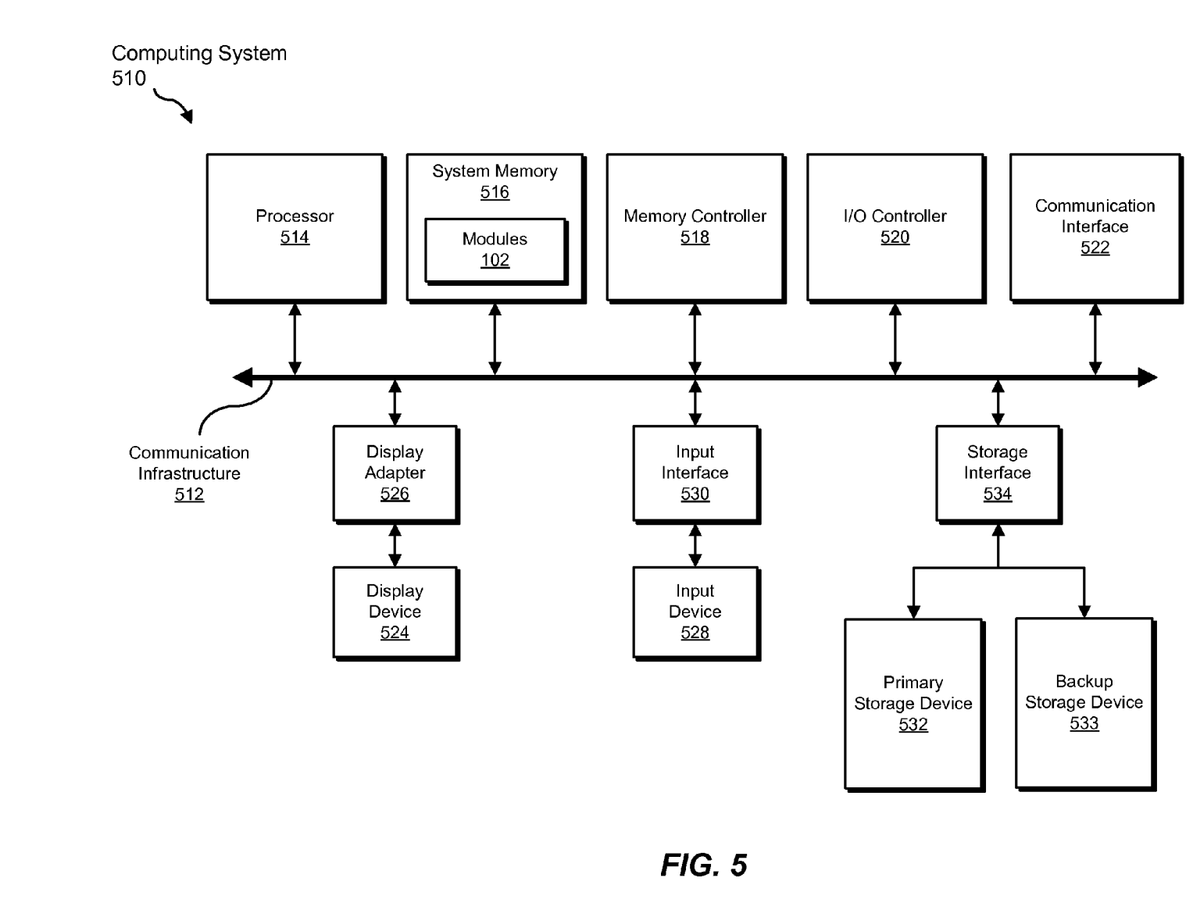
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein. For example, processor 514 may perform and/or be a means for performing, either alone or in combination with other elements, one or more of the identifying, calculating, determining, backing up, designating, prioritizing, and/or deleting steps described herein. Processor 514 may also perform and/or be a means for performing any other steps, methods, or processes described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an input/output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512. In certain embodiments, memory controller 518 may perform and/or be a means for performing, either alone or in combination with other elements, one or more of the steps or features described and/or illustrated herein, such as identifying, calculating, determining, backing up, designating, prioritizing, and/or deleting.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534. I/O controller 520 may be used, for example, to perform and/or be a means for performing, either alone or in combination with other elements, one or more of the identifying, calculating, determining, backing up, designating, prioritizing, and/or deleting steps described herein. I/O controller 520 may also be used to perform and/or be a means for performing other steps and features set forth in the instant disclosure.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution. In certain embodiments, communication interface 522 may perform and/or be a means for performing, either alone or in combination with other elements, one or more of the identifying, calculating, determining, backing up, designating, prioritizing, and/or deleting steps disclosed herein. Communication interface 522 may also be used to perform and/or be a means for performing other steps and features set forth in the instant disclosure.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device. In at least one embodiment, input device 528 may perform and/or be a means for performing, either alone or in combination with other elements, one or more of the identifying, calculating, determining, backing up, designating, prioritizing, and/or deleting steps disclosed herein. Input device 528 may also be used to perform and/or be a means for performing other steps and features set forth in the instant disclosure.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

In certain embodiments, storage devices 532 and 533 may be used, for example, to perform and/or be a means for performing, either alone or in combination with other elements, one or more of the identifying, calculating, determining, backing up, designating, prioritizing, and/or deleting steps disclosed herein. Storage devices 532 and 533 may also be used to perform and/or be a means for performing other steps and features set forth in the instant disclosure.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
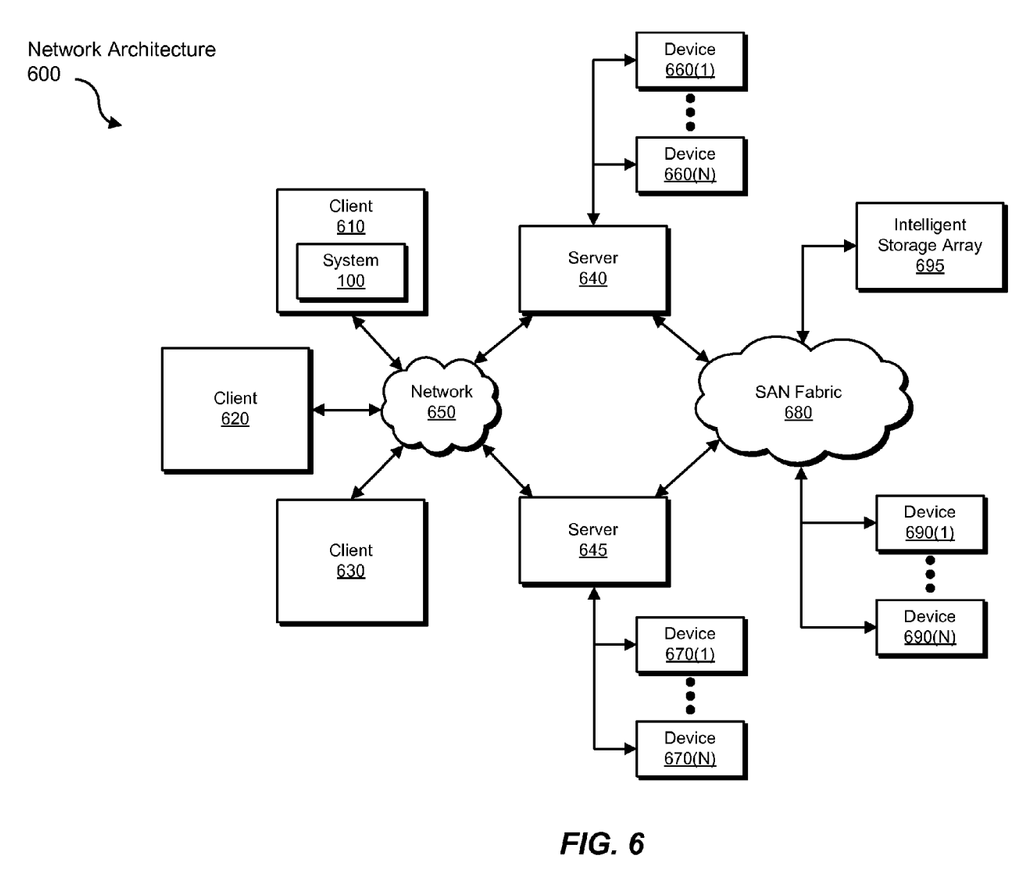
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. Client systems 610, 620, and 630 generally represent any type or form of computing device or system, such as exemplary computing system 510 in FIG. 5. In one example, client system 610 may include system 100 from FIG. 1.

Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650. Accordingly, network architecture 600 may perform and/or be a means for performing, either alone or in combination with other elements, one or more of the identifying, calculating, determining, backing up, designating, prioritizing, and/or deleting steps disclosed herein. Network architecture 600 may also be used to perform and/or be a means for performing other steps and features set forth in the instant disclosure.

As detailed above, computing system 510 and/or one or more components of network architecture 600 may perform and/or be a means for performing, either alone or in combination with other elements, one or more steps of an exemplary method for securing data on mobile devices.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules described herein may transform a mobile computing device into a device for securing mobile data.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for securing data on mobile devices, at least a portion of the method being performed by a computing device comprising at least one processor, the method comprising:
    identifying a first mobile computing device and a second mobile computing device paired via a wireless communication technology that facilitates communication between the first mobile computing device and the second mobile computing device;
    identifying a maximum expected distance between the first and second mobile computing devices;
    calculating a current distance between the first and second mobile computing devices;
    determining that the current distance between the first and second mobile computing devices exceeds the maximum expected distance between the first and second mobile computing devices;
    backing up data stored on the first mobile computing device in response to the determination that the current distance exceeds the maximum expected distance.

2. The computer-implemented method of claim 1, further comprising deleting the data stored on the first mobile computing device after backing up the data stored on the first mobile computing device.

3. The computer-implemented method of claim 1, wherein backing up the data stored on the first mobile computing device comprises:
   identifying sensitive data stored on the first mobile computing device;
   designating the sensitive data for backup.

4. The computer-implemented method of claim 1, wherein backing up the data stored on the first mobile computing device comprises:
   identifying a prioritization for backing up files on the first computing first mobile computing device;
   backing up the files in an order according to the prioritization.

5. The computer-implemented method of claim 4, wherein the prioritization comprises at least one of:
   prioritizing user-composed communications over other data;
   prioritizing contact information over other data.

6. The computer-implemented method of claim 4, wherein the prioritization comprises prioritizing data associated with a user account on the first mobile computing device marked for prioritization.

7. The computer-implemented method of claim 1, wherein backing up the data stored on the first mobile computing device comprises backing up the data to the second mobile computing device.

8. The computer-implemented method of claim 1, wherein backing up the data stored on the first mobile computing device comprises backing up the data to an online third-party storage service.

9. A system for securing data on mobile devices, the system comprising:
   an identification module programmed to:
      identify a first mobile computing device and a second mobile computing device paired via a wireless communication technology that facilitates communication between the first mobile computing device and the second mobile computing device;
      identify a maximum expected distance between the first and second mobile computing devices;
   a calculation module programmed to calculate a current distance between the first and second mobile computing devices;
   a determination module programmed to determine that the current distance between the first and second mobile computing devices exceeds the maximum expected distance between the first and second mobile computing devices;
   a backup module programmed to back up data stored on the first mobile computing device in response to the determination that the current distance exceeds the maximum expected distance;
   at least one processor configured to execute the identification module, the calculation module, the determination module, and the backup module.

10. The system of claim 9, wherein the backup module is further programmed to delete the data stored on the first mobile computing device after backing up the data stored on the first mobile computing device.

11. The system of claim 9, wherein the backup module is programmed to back up the data stored on the first mobile computing device by:
   identifying sensitive data stored on the first mobile computing device;
   designating the sensitive data for backup.

12. The system of claim 9, wherein the backup module is programmed to back up the data stored on the first mobile computing device by:
   identifying a prioritization for backing up files on the first mobile computing device;
   backing up the files in an order according to the prioritization.

13. The system of claim 12, wherein the prioritization comprises at least one of:
   prioritizing user-composed communications over other data;
   prioritizing contact information over other data.

14. The system of claim 12, wherein the prioritization comprises prioritizing data associated with a user account on the first mobile computing device marked for prioritization.

15. The system of claim 9, wherein the backup module is programmed to back up the data stored on the first mobile computing device by backing up the data to the second mobile computing device.

16. The system of claim 9, wherein the backup module is programmed to back up the data stored on the first mobile computing device by backing up the data to an online third-party storage service.

17. A non-transitory computer-readable-storage medium comprising one or more computer-executable instructions that, when executed by at least one processor of a computing device, cause the computing device to:
   identify a first mobile computing device and a second mobile computing device paired via a wireless communication technology that facilitates communication between the first mobile computing device and the second mobile computing device;
   identify a maximum expected distance between the first and second mobile computing devices;
   calculate a current distance between the first and second mobile computing devices;
   determine that the current distance between the first and second mobile computing devices exceeds the maximum expected distance between the first and second mobile computing devices;
   back up data stored on the first mobile computing device in response to the determination that the current distance exceeds the maximum expected distance.

18. The computer-storage-readable medium of claim 17, wherein the one or more computer-executable instructions further cause the computing device to delete the data stored on the first mobile computing device after backing up the data stored on the first mobile computing device.

19. The computer-implemented method of claim 17, wherein backing up the data stored on the first mobile computing device comprises:
   identifying sensitive data stored on the first mobile computing device;
   designating the sensitive data for backup.

20. The computer-implemented method of claim 17, wherein backing up the data stored on the first mobile computing device comprises:
   identifying a prioritization for backing up files on the first mobile computing device;
   backing up the files in an order according to the prioritization.

* * * * *

UNITED STATES PATENT AND TRADEMARK OFFICE
CERTIFICATE OF CORRECTION

PATENT NO. : 8,423,511 B1
APPLICATION NO. : 13/178068
DATED : April 16, 2013
INVENTOR(S) : Yadvinder Bhatia Page 1 of 1

It is certified that error appears in the above-identified patent and that said Letters Patent is hereby corrected as shown below:

In the Claims:

Claim 4, at column 15, lines 10 to 11, should read:

identifying a prioritization for backing up files on the first mobile computing device;

Claim 18, at column 16, line 44, should read:

The computer-readable-storage medium of claim 17,

Claim 19, at column 16, line 49, should read:

The computer-readable-storage medium of claim 17,

Claim 20, at column 16, line 55, should read:

The computer-readable-storage medium of claim 17,

Signed and Sealed this
Seventeenth Day of September, 2013

Teresa Stanek Rea
*Deputy Director of the United States Patent and Trademark Office*